United States Patent [19]
Kitamura

[11] 3,975,763
[45] Aug. 17, 1976

[54] SIGNAL TIME COMPRESSION OR EXPANSION SYSTEM

[75] Inventor: Masatsugu Kitamura, Fujisawa, Japan

[73] Assignee: Victor Company of Japan, Limited, Japan

[22] Filed: Apr. 29, 1974

[21] Appl. No.: 471,715

[30] Foreign Application Priority Data
June 4, 1973  Japan............................... 48-61864
May 3, 1973  Japan............................... 48-49292
Apr. 30, 1973  Japan............................... 48-48142

[52] U.S. Cl. ............................ 360/8; 179/15.55 T
[51] Int. Cl.² ........................................... G11B 5/00
[58] Field of Search............. 360/8, 36; 179/15.55 T

[56] References Cited
UNITED STATES PATENTS

| | | | |
|---|---|---|---|
| 3,749,837 | 7/1973 | Doughty | 360/36 |
| 3,855,424 | 12/1974 | Tharmaratram | 179/15.55 T |
| 3,873,778 | 3/1975 | Mutjuura | 179/15.55 T |

*Primary Examiner*—James W. Moffitt
*Attorney, Agent, or Firm*—Holman & Stern

[57] ABSTRACT

A signal time compression or expansion system comprises a plurality of gates for permitting the passage of reproduced signals successively with respectively different time bands in contiguous sequence or with partially overlapping parts and without discontinuity with respect to time, the signals having been reproduced with a frequency spectrum scale differing from that at the time of recording, a plurality of memory circuits provided to correspond respectively to the plurality of gates and operating to write in and store the signals thus passed through the corresponding gates, a control circuit for controlling the memory circuits thereby to cause the same to carry out writing in and reading out with respectively specific write-in periods and read-out periods, and a mixer for mixing the signals thus read out from the memory circuit and combining the same into one continuous signal.

5 Claims, 8 Drawing Figures

SIGNAL TIME COMPRESSION OR EXPANSION SYSTEM

BACKGROUND OF THE INVENTION

The present invention relates to a signal time compression or expansion system and more particularly to a signal time compression or expansion system for performing write-in and read-out operations of a reproduced signal for memory circuits sequentially and continuously in restoring a frequency spectrum of a signal reproduced from a recording and reproducing apparatus to the original at a speed different from that in recording and for obtaining a signal of smooth envelope waveform without causing lacks of signal.

It has been common practice in recording audio signals on a recording medium at ordinary speeds to reproduce the recorded signals at higher or lower speeds or to quicken or retard the tempo of reproduced speech voices as required. This method has sometimes been employed in consolidating the recorded speech contents delivered at a lecture meeting or at a round-table discussion, in the case of translating into a foreign language by listening to a recorded and reproduced discourse spoken in another language, in language lessons, and in other applications. This method has been used sometimes by busy persons and blind persons.

Merely switching one tape speed to another of an ordinary tape recorder may succeed in changing the tempo of a recorded speech, but this varies the pitch of voice sound and tone quality as well. This makes a reproduced speech indistinct and the speech content difficult to comprehend. Thus, there arises the need for a method whereby the tempo of a talk can be varied without accompaniment of variation in tone or sound quality.

There has been conventional method for meeting such a demand which comprises extracting a part of the original signals and slicing the remainder to such a degree that the speech content can still be understood when shortening the reproduction time interval, while inserting blank portions or reproducing the same portion repeatedly when the reproduction time is to be prolonged. With this conventional method, write-in or store and read-out operations are performed alternately and repeatedly by use of a single memory circuit. For this reason, the reproduced signal is liable to become intermittent or discontinuous, and its waveform envelope becomes at times a so-called tone-burst waveform.

A problem accompanying this method is that the tone quality of a reproduced sound is of poor quality accompanied by disturbances and interruptions.

Another problem encountered in the practice of this method is that memorized and readout signals occupy only a part of the input signal, and in the case where a tape is played back at a speed which is twice the recording speed, for instance, stored and readout signals correspond to only one-third of the playback signal, resulting in a great information loss, and hence the articulation of the reproduced voice is considerably sacrificed.

SUMMARY OF THE INVENTION

Accordingly it is an object of the present invention to provide a novel and useful time compression or expansion system for signals in which the above described limitations of the prior art are overcome.

It is a specific object of the present invention to provide a signal time compression or expansion system so contrived that a tone of a time compressed or expanded reproduced voice signal reproduced from a tape recorder at a high or low reproduction speed becomes equivalent to a tone in ordinary reproduction and that signal interrupted portions can never occur. By this provision according to the system of the present invention, the possibility of the signal tone quality or articulation being deleteriously affected can be completely eliminated.

Still another object of the present invention is to provide a signal time compression or expansion system capable of performing read-in or store and read-out of a reproduced signal to and from a memory continuously as a whole, thereby eliminating the possibility of signal tone quality and articulation impairment.

A further object of the present invention is to provide a signal time compression and expansion system in which the circuit utilization factor is improved by causing a clock pulse frequency for driving a memory to vary.

A still further object of the present invention is the provision of a signal time compression and expansion system incorporating memories of extreme structural compactness and simplicity by splitting the frequency band of a signal to be written into a memory, thereby to narrow its bandwidth.

Further objects and features of the present invention will be apparent from a consideration of the detailed description that follows when read in conjunction with the accompanying drawings.

DETAILED DESCRIPTION

Figure 1:
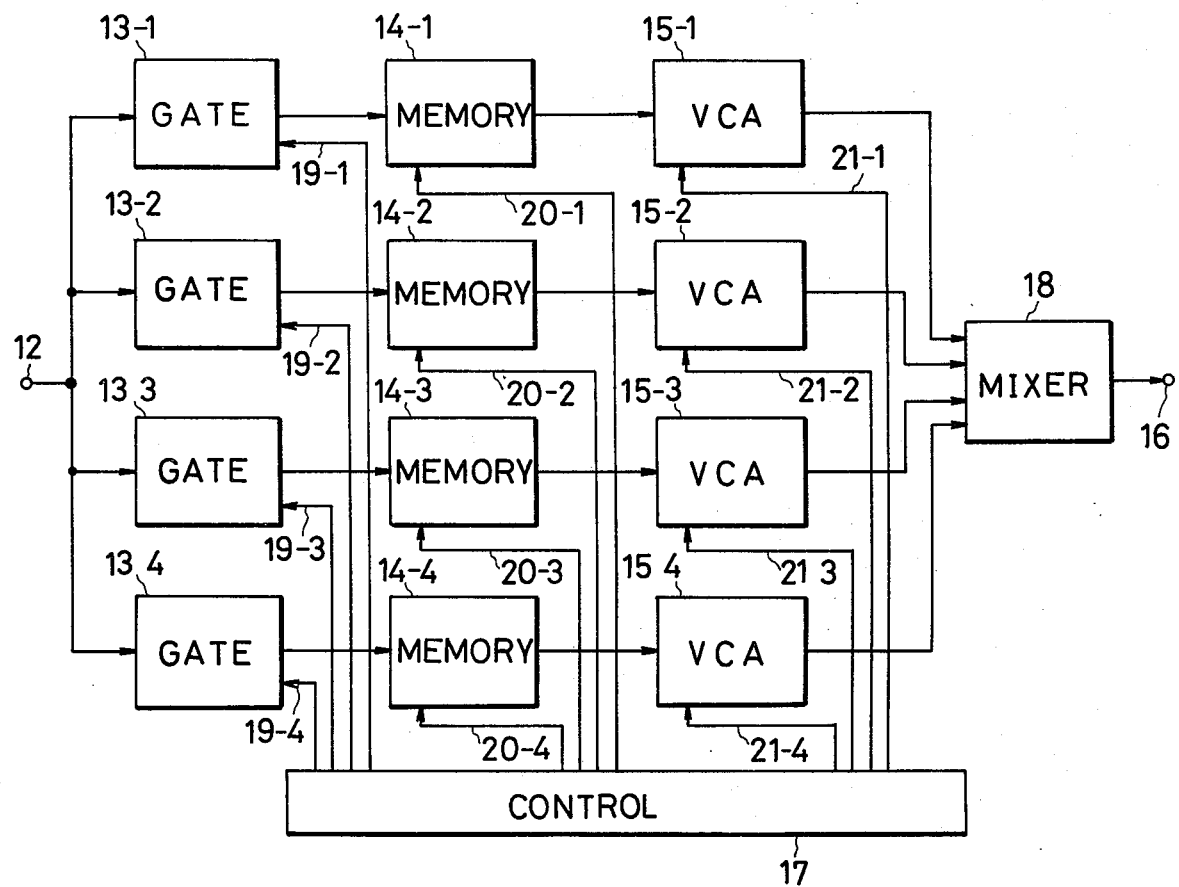
FIG. 1 is a schematic block diagram illustrating the essential organization of one example of a signal time compression or expansion system constituting a preferred embodiment of the present invention.
Figure 2:
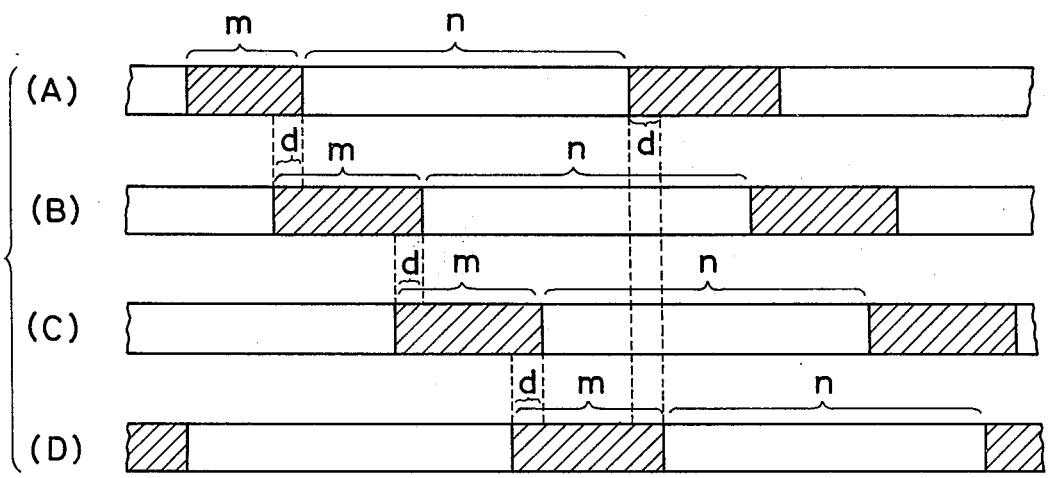
FIGS. 2(A) through 2(D) are time charts respectively indicating the phase relationships of write-in and read-out operations to and from the memory circuits in the system shown in FIG. 1.

The first embodiment of the system according to this invention with respect to the case of time compression wherein a tape is caused to travel at a speed which is twice the recording speed and a signal is reproduced therefrom will first be described in connection with FIGS. 1 through 4.

An audio signal reproduced from a tape recorder at the double speed is fed to gates 13-1 through 13-4 via an input terminal 12. These gates 13-1 through 13-4 are opened sequentially, one at a time, by control signals delivered via lines 19-1 through 19-4 from a control unit 17, permitting passage of the input audio signal in succession during the periods represented by the hatched portions m in FIGS. 2(A) through 2(D) with a phase relationship as indicated.

Signals that have passed through the gates 13-1 through 13-4 are respectively fed to memories 14-1 through 14-4 and written or stored therein sequentially during the periods indicated by the hatched portions m in FIGS. 2(A) through 2(D) by clock pulses delivered from the control unit 17 via lines 20-1 through 20-4. In this case, use of shift registers capable of shifting sequentially the stored content in one direction, such as chainform memories or a bucket brigade device (BBD), is appropriate.

When each of the memories 14-1 through 14-4 has completed writing operation to its full storage capacity, control signals delivered from the control unit 17 via lines 19-1 through 19-4 cause the gates 13-1 through 13-4 to close and the frequency of clock pulses delivered from the control unit 17 via lines 20-1 through 20-4 to be reduced to one half. Thus, the read-out operation of the stored contents of the memories 14-1 through 14-4 takes place sequentially during the periods indicated by the blank portions n in FIGS. 2(A) through 2(D).

Here, the time compression factor $K$ can be expressed as $K = n/m$, where $m < n$. The condition for which the mutually overlapped period $d$ becomes zero during the memory periods of the memories 14-1 through 14-4 is given by $$m + n = N(m - d)$$

or, $$N = 1 + (n/m) = 1 + K,$$

where the number of memories is taken as $N$.

Accordingly, the maximum value of the compression factor is given by $K = N - 1$, and, in this case, the overlapping interval $d$ of the writing periods is reduced to zero. Incidentally, "void" or "lack" intervals will occur in writing operation for the values of $K$ in excess of $N - 1$.

While a description has been given above of time compression in this embodiment, this description will hold for time expansion, provided that the hatched (m) and blank portions are taken as the reading and writing periods, and $m > n$. The condition for which the overlapped interval $d'$ of the writing periods becomes zero can be expressed as $$m + n = N(n - d')$$

or, $$N = 1 + (m/n) = 1 + K'$$

wherein $K'$ denotes the expansion rate. The maximum value of the expansion rate is given by $$K' = N - 1$$

and, in this case, $d'$ becomes zero. Voids appear in the reading signal for the values of $K'$ in excess of $N - 1$.

Signals read out sequentially within the periods from the memories 14-1 through 14-4 are respectively fed to voltage controlled amplifiers (VCAs) 15-1 through 15-4. The VCAs 15-1 through 15-4 are caused to perform gating action by signals of the window function (hereinafter abbreviated as window signal) impressed thereupon via lines 21-1 through 21-4 from the control unit 17. Output signals from the VCAs are mixed by a mixer 18, and a composite signal is derived from an output terminal 16. The variations in amplification degree of the VCAs are made gradual by the window signals, whereby the envelope of the composite signal becomes amply smooth.

Writing in and reading out operations for the reproduced signal supplied from the input terminal 12 takes place without interruptions by the memories 14-1 through 14-4. Therefore, there is no possibility of missing information occurring in the signals obtained from the output terminal 16. Thus, there is little possibility of the tone quality and articulation of a reproduced voice derived through the time compression process being impaired.

Figure 3:
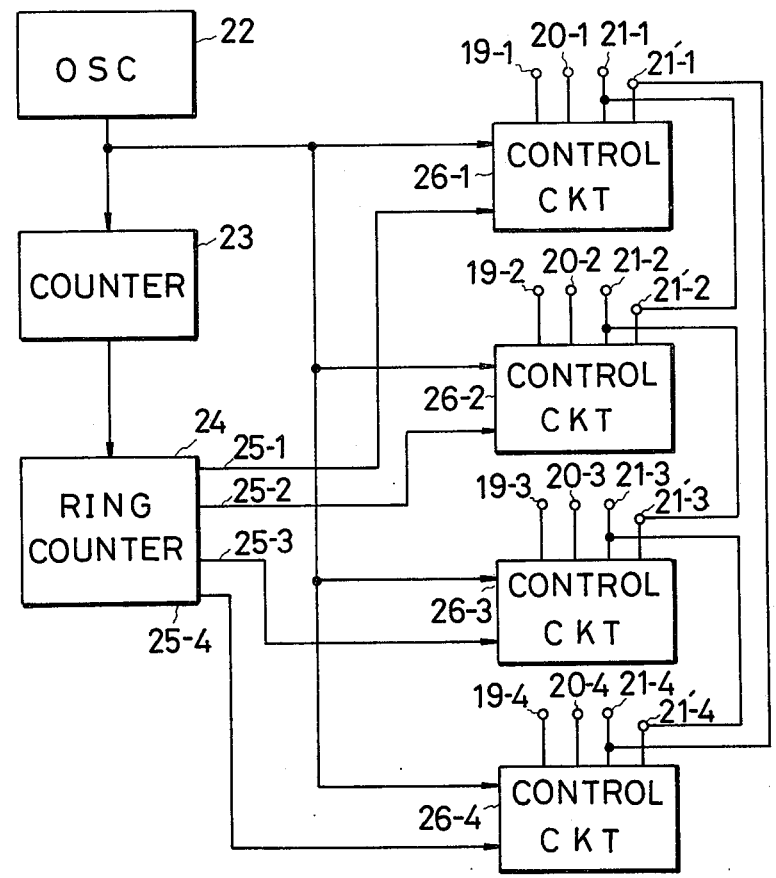
FIG. 3 is a schematic block diagram showing one embodiment of the control section in the system shown in FIG. 1.
Figure 4:
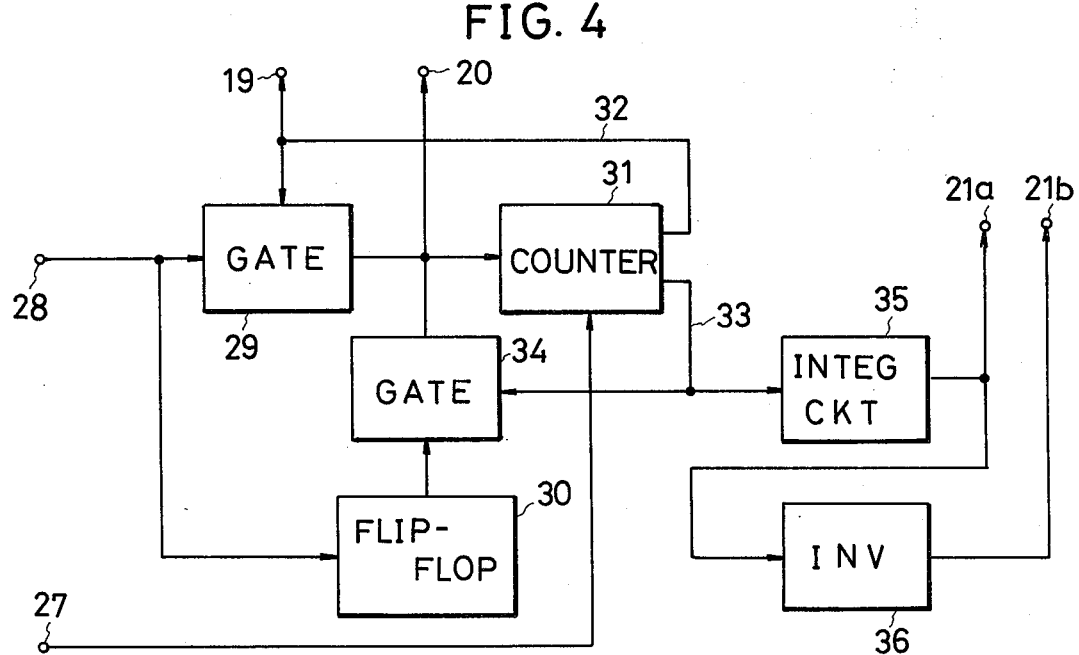
FIG. 4 is a schematic block diagram showing one embodiment of one of the control circuits in the control section shown in FIG. 3.

In one embodiment of the control unit 17 as illustrated in FIG. 3, the output of a clock pulse generator 22 is fed to a counter 23 and to control circuits 26-1 through 26-4. The counter 23 is provided for determining timing for initiation of writing operations of the memories 14-1 through 14-4, developing pulses at (m - d) intervals. The output pulses of the counter 23 drive a ring counter 24. The ring counter 24 delivers output signals in succession to control circuits 26-1 through 26-4 through lines 25-1 through 25-4. All of the control circuits 26-1 through 26-4 divided into several systems are of the same circuit structure, the circuit structure of one of them being illustrated in FIG. 4.

A clock pulse from the oscillator 22 incoming through a terminal 28 is fed to a gate 29 and at the same time, to a flip-flop 30. A signal from the ring counter 24 incoming through a terminal 27 is fed to a counter 31 to reset it. Thus, when the content of the counter 31 becomes 0, a signal in a line 32 becomes ON and the gate 29 opens, while a gate 34 closes when a signal in a line 33 becomes OFF.

A signal derived through a terminal 19 is delivered to a line 19-i (i = 1 through 4) as a control signal and fed to a corresponding gate 13-i to open the gate. A signal derived through a terminal 20 is fed to a memory 14-i through line 20-i to cause it to perform write-in operation.

As soon as the counter 31 has just counted clock pulses delivered through the terminal 28 by a number corresponding to the writing capacity interval of a memory, a signal in the line 32 becomes OFF, and both the gate 29 and the gate 13-i are closed. Simultaneously, a signal in the line 33 becomes ON, and the gate 34 opens. As a consequence, the counter 31 initiates counting of pulses of which frequency has been reduced to one half of that of the clock pulse by the flip-flop 30. Therefore, a reading-out operation is initiated from the memory 14-i at a speed which is one half the writing-in speed.

A signal from the line 33 passes through an integrator circuit 35 and is led out through a terminal 21a, thereafter being fed to the VCA 15-i via line 21-i as a window signal. The window signal causes the amplification degree of the VCA to increase at a slowly increasing rate from zero to a predetermined value and the output of the memory 14-i to be applied to the mixer 18.

As soon as the content of the counter is restored to zero, the memory resumes writing operation, and the above mentioned operations are repeated.

The output of the integrator 35 undergoes phase inversion by a phase inverter 36 and is derived from a terminal 21b to be fed to the VCA 15-h ($h = i - 1$ and $h = 4$ for $i = 1$) through a line 21-h. A signal derived from the terminal 21b falls as a signal derived through a terminal 21a rises and the signal causes a decrease in the amplification degree of the VCA 15-h in a stage preceding the VCA 15-i for initiating gating of a signal with an increase in the amplification degree and, hence, the output of the VCA 15-h to decrease.

Figure 6:
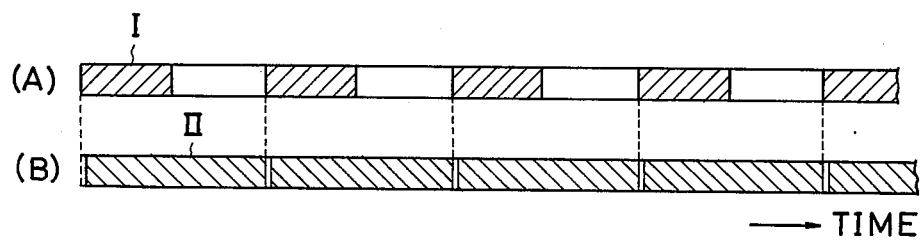
FIGS. 6(A) and 6(B) are time charts indicating the relationship between the memory write-in and read-out periods.
Figure 7:
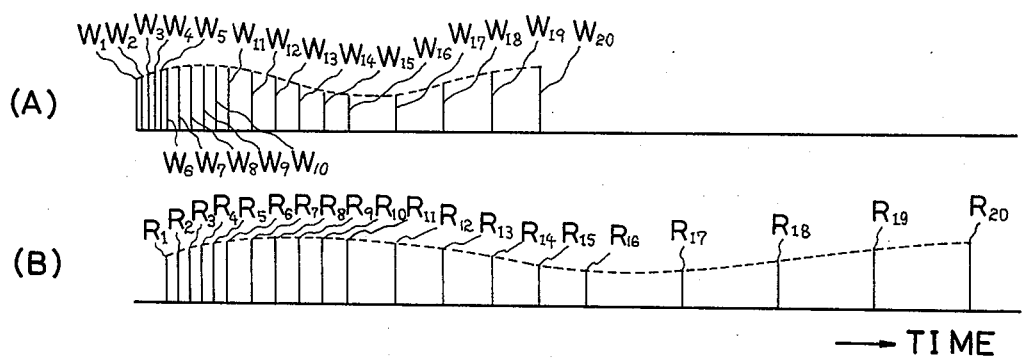
FIGS. 7(A) and 7(B) are time charts indicating the relationship between the write-in and read-out sampling values of a memory.

An embodiment of a system so contrived as to enhance the memory utilization efficiency will now be described with reference to FIGS. 5 through 7. Scale compensation can be effected at a constant frequency by making $f_1 = (f_0/f_i) \times f_o$, where $f_o$ and $f_1$ are the sampling speed of writing into a memory and the reading out speed, respectively. The time compression factor $K$ in this case is given by $f_i/f_o$.

Figure 5:
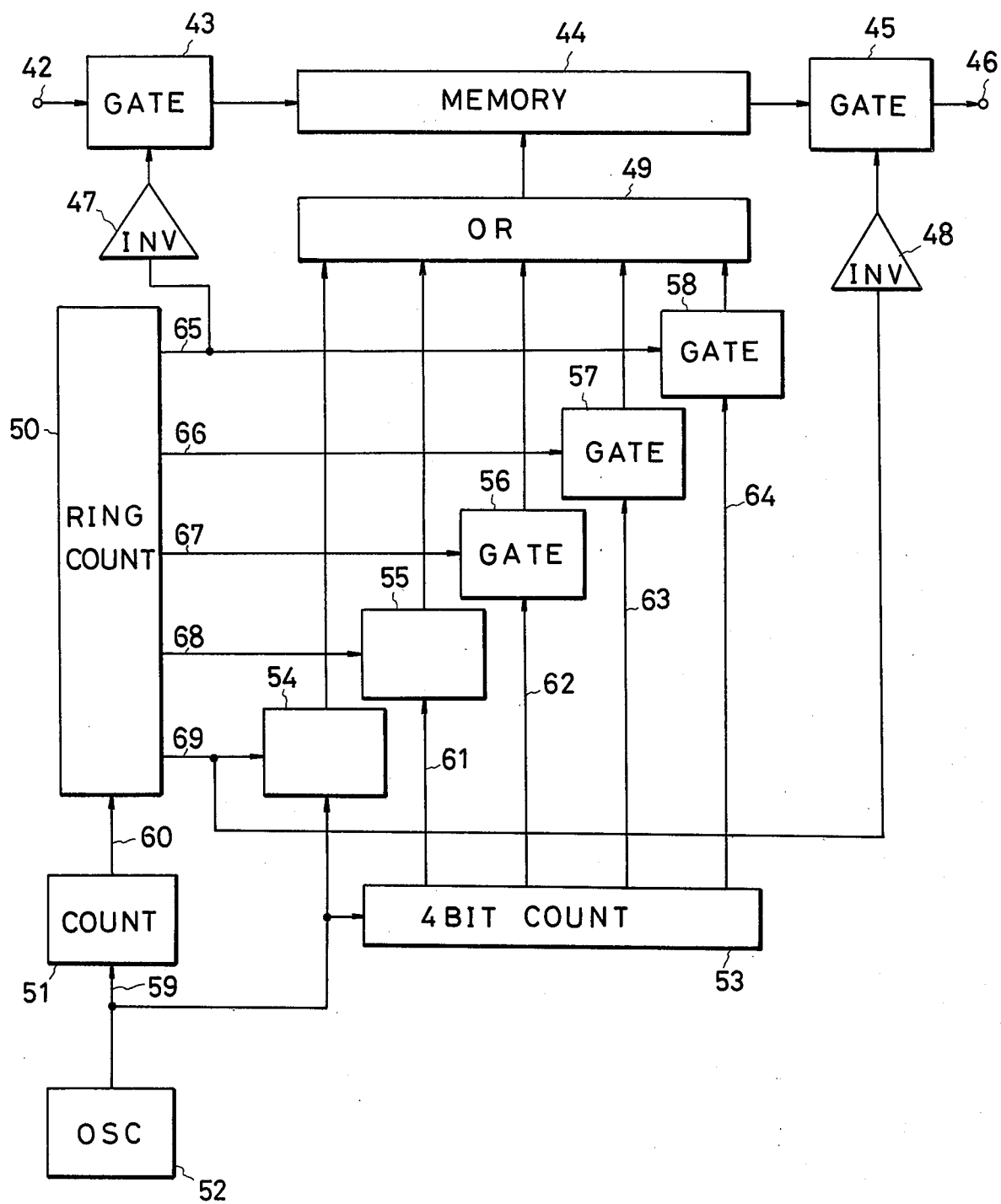
FIG. 5 is a schematic block diagram showing one embodiment of a memory drive circuit.

In the embodiment shown in FIG. 5, the time compression factor K is taken as 2. A reproduced signal from a tape recorder is fed to a gate 43 through an input terminal 42, while a counter 51 generates an output signal each time it has counted M output pulses delivered from a clock pulse generator 52 (where M is 16 in this example). An output signal from the counter 51 is fed to a five-stage ring counter 50 through a line 60 to cause it to perform shifting operation. A four-bit counter 53 receives clock pulses from the clock pulse generator 52 and feeds output pulses of frequencies equal to ½, ¼, ⅛, and 1/16 of the clock pulse frequency to gates 55, 56, 57, and 58, respectively, via lines 61, 62, 63, and 64.

When the counter 51 indicates zero, the five-stage ring counter 50 causes a gate 54 to open, whereby a clock pulse delivered from the clock pulse generator 52 is fed to a memory 44 comprising a bucket brigade device via the gate 54 and an OR circuit 49 to drive the memory at a speed corresponding to the clock pulse frequency (for example, 128 KHz).

On the other hand, the gate 43 is held open in this case by the output of an inverter 47, and a signal from the terminal 42 is fed to the memory 44 after passing through the gate 43. Thus, the memory stores M or 16 sampling values of the incoming signal. In this case, the gates 55, 56, 57, and 58 remain closed while the gate 45 is also closed by the output of the inverter 48.

Then the counter 51 again indicates zero at the conclusion of counting M or 16 pulses. In this case, the five-stage ring counter 50 is caused to shift by the output of the counter 51, and the gate 55 is opened by the same output, with the result that the gates 54, 56, 57, and 58 are all closed. Accordingly, a pulse of 64 KHz, or one-half the clock pulse frequency, is impressed upon the memory 44 from the four-bit counter 53 via the gate 55 and the OR circuit 49, driving the memory 44 at a speed of 64 KHz. In this case, signals in output lines 65 and 69 of the five-stage ring counter 50 are both OFF, and, hence, both gates 43 and 45 are open. Therefore, a signal through the terminal 42 is continuously fed to the memory 44 via the gate 43, and an output singal from the memory 44 is derived from a terminal 46 via a gate 45.

In a similar manner, as soon as the counter 51 indicates zero at the conclusion of counting M or 16 pulses, a signal on an output line 67 of the five-stage ring counter 50 becomes ON, and, hence, the gate 56 opens. Thus, a signal of 32 KHz, or one-fourth of the clock pulse frequency, is delivered from the four-bit counter 53 and impressed upon the memory 44 to drive the same. Since the signals on output lines 65 and 69 of the five-stage ring counter 50 are both OFF at this time, the gates 43 and 45 remain opened by the outputs of the inverters 47 and 48. Therefore, writing in the memory 44 of a signal from the terminal 42 and reading out from the memory 44 of a signal through the terminal 46 can both be carried out.

When similar operations are continued, the counter 51 indicates zero, only the line 65 of the five-stage ring counter 50 becomes ON, and only the gate 58 opens, while the other gates 54, 55, 56, and 57 remain closed. The gate 43 is closed by the output of the inverter 47, while the gate 45 remains open. At this time, therefore, an input signal is not fed to the memory 44, and only a signal read out from the memory 44 is derived through the terminal 46. At this time, the memory 44 is being driven by a frequency which is 1/16 of the clock pulse frequency which has been sent through a line 64 of the four-bit counter 53, gate 58, and the OR circuit 49, that is, a frequency of 8 KHz.

As the foregoing operations continue, M or 16 sampling values written at a certain sampling speed are derived through the output terminal 46 invariably at one-half of the speed. That is to say, the frequency spectrum of a readout signal is equal to one of which frequency spectrum scale of a signal delivered through the input terminal 42 and written in the memory has been compressed to just one-half. Thus, an input signal through the terminal 42 of which frequency spectrum scale has been expanded to twice by the double-speed reproduction is derived from the terminal 46 as a signal fully restored to the original frequency spectrum scale. The foregoing operations are repeated periodically by the five-stage ring counter 50, the writing in and reading out operations of which are as illustrated in FIGS. 6(A) and 6(B).

In FIG. 6(A), the hatched portion I represents the write-in operation interval, and the hatched portion II in FIG. 6(B) represents the reading-out interval. The blank portions in FIGS. 6(A) and 6(B) indicate the intervals during which neither writing in nor reading out operation takes place. FIGS. 7(A) and 7(B) graphically indicate the relationships between the sampling values and time on the assumption that the time compression rate is 2 and the memory capacity is 5. FIG. 7(A) indicates the relationship between the sampling values to be written in and the time, and FIG. 7(B) indicates that between the sampling values to be read out and the time.

These figures show that each time the sampling value of the input signal shifts by an amount of the memory capacity or 5, the sampling speed keeps on changing at a constant ratio $f_o/f_i$, and both writing in and reading out operations are kept continued simultaneously except for the initial full-memory-capacity writing-in period and the memory capacity readout period after the cessation of the final writing in operation.

In this connection, each of the dotted line curves in the figures denotes an envelope, and the subscripts affixed to the sampling values W's and R's denote numbers indicating the timing sequence of these values. By the periodic repetition of the foregoing operations, the input and output signals with few interruptions and optimum efficiencies are available.

Assuming that the time compression rate is 2 and the memory capacity is 5, the utilization factor of the input signal and the time occurrence rate of the output signal is respectively ⅓ and ⅔ with the conventional system, whereas the former and the latter have been improved to 15/31 (or approximately ½) and 30/31 (or approximately unity). These proportions will be further improved with increasing the sampling speed variable range.

If the writing in and reading out periods indicated by the time duration bounded by the dotted lines in FIGS. 6(A) and 6(B) are taken the same as those of the conventional system, the required memory length can be contracted.

Further, by making the frequency of a signal in the line 64 of the four-bit counter 53, which has the slowest sampling speed according to this invention, equal to the frequency at the readout speed of the conventional system, the memory time length obtained by the system of the present invention becomes 16/31 of the above-mentioned period in contrast to ⅔ of the same period obtained by the conventional system. In other words, the memory time length has been appreciately contracted.

While a description has been set forth above with respect to a case where the clock pulse frequency is decreased in the above described embodiment, the clock pulse frequency may be increased.

Figure 8:
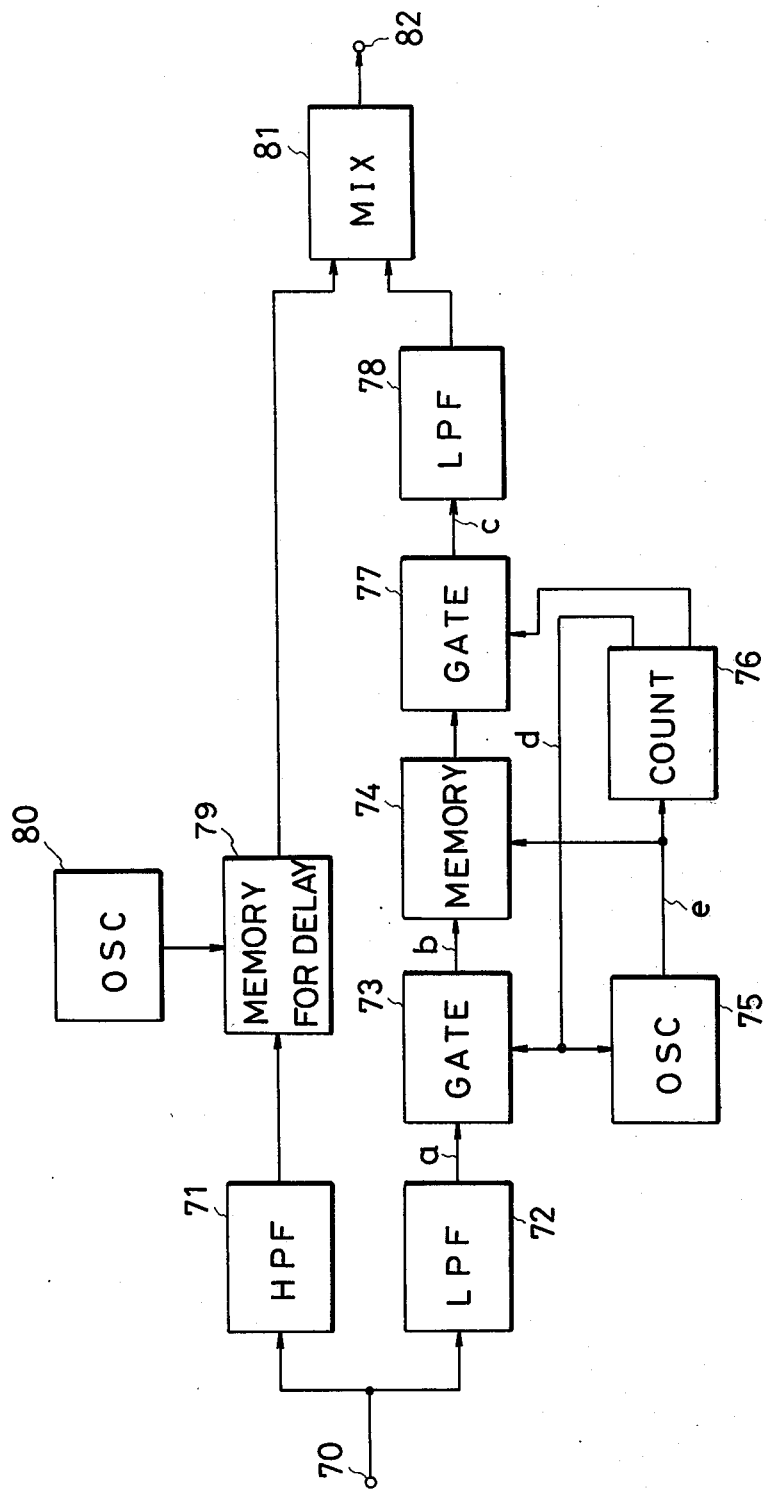
FIG. 8 is a schematic block diagram showing one embodiment of a system for writing a reproduced signal into a memory after dividing its frequency band.

Next, a description will be presented in connection with FIG. 8 of an embodiment of the invention so contrived that the frequency band of a signal to be written in the memory is divided to narrow the bandwidth of the signal, and the memory can be miniaturized.

Of various reproduced audio signals fed to an input terminal 70, those signals in a frequency range having an upper limit of 2200 Hz, wherein first and the second formants which are essential for the discrimination of vowels exist, pass through a low-pass filter 72 of an upper cut off frequency of $K \times 2{,}200$ Hz, where $K$ is the time compression rate, that is, of 4,400 Hz when $K = 2$, for example, and are supplied by way of gate 73 to a memory 74 to be written therein. Thus a signal delivered from an oscillator 75 to be fed to the memory 74 and written therein is fed to the memory 74 and a counter 76.

The counter 76 can count a maximum of $20M - 1$ pulses in response to the capacity M of the memory 74. When $M - 1$ pulses have been counted by the counter 76, the memory 74 memorizes M sampling values which correspond to its full capacity. When the counter 76 has counted M pulses, its output signal is reversed, and the gate 73 is closed. In this case, writing in operation of the memory 74 is suspended. With inversion of the output from the counter 76, the oscillation frequency of the oscillator 75 is changed from $f_i$ to $f_o$. Then a signal read out at the speed of the frequency $f_o$ is derived from the memory 74 through a gate 77 which has been opened by the inversion of the counter output.

When the counter 76 has counted 2M pulses, the content of the counter is reset or restored to zero, causing the gate 77 to close and at the same time, the gate 73 to open. Thus writing in operation of the memory 74 is resumed.

A signal that has passed through the gate 77 is deprived of higher harmonic waves due to the sampling by a low-pass filter 78 having the upper cutoff frequency of 2,200 Hz and is then fed to a mixer 81. On the other hand, those components of the abovementioned voice signals which are not directly related to the discrimination of vowels, pass through a high-pass filter 71 having a lower cutoff frequency at 4,400 Hz and are fed to a delay memory 79 to undergo sampling thereat by a clock signal delivered from a driving clock pulse oscillator 80. The sampled signal is fed to a mixer 81. In this connection, the delay memory 79 may be omitted.

The two signals from the memory 79 and the low-pass filter 78 are mixed by the mixer 81, and the mixed output is derived from an output terminal 82. After this output is suitably amplified by an amplifier, it is emitted as sound from a loudspeaker. In this connection, the higher harmonics produced by sampling due to the oscillator 80 should be eliminated by a suitable band limiting means associated with the amplifier or the loudspeaker.

Further, this invention is not limited to these embodiments but various variations and modifications may be made without departing from the scope and spirit of the invention.

What is claimed is:
1. A signal time compression or expansion system comprising:
   means for supplying audio signals reproduced from a recording medium at a speed different from that at which the audio signals have been recorded by a recording and reproducing apparatus;
   means for generating first clock pulses;
   means for generating second clock pulses, the frequency ratio of the first clock pulses to the second clock pulses being equal to the ratio of the speed at which the audio signals are reproduced to the speed at which the audio signals have been recorded;
   counter means responsive to the first clock pulses for generating a pulse every specific time interval;
   ring counter means responsive to the output pulses of said counter means for producing a plurality of pulse signals having a pulse width equal to the specific time interval, phases of the pulse signals being shifted successively by the pulse width, the plurality being an integer greater than two;
   a plurality of gating means which are equal in number to the plurality of pulse signals of said ring counter means, and which receive the supplied audio signals, each of said gating means responsive to the corresponding one of the pulse signals of said ring counter means passing the supplied audio signals during a time interval corresponding to the pulse width of the corresponding pulse signal and interrupting the supplied audio signals during the other time interval;
   a plurality of shift registers which are equal in number to the plurality of gating means, and each of which is connected to the corresponding one of the plurality of gating means;
   means for applying the first clock pulses to the respective shift registers during time intervals in which the respective corresponding gating means pass the supplied audio signals, to write and store the audio signals in the corresponding shift register, and for applying the second clock pulses to the respective shift registers during time intervals in which the respective corresponding gating means interrupt the supplied audio signals, to read out the audio signals from the corresponding shift register; and means for mixing the audio signals read out of the shift registers and combining the same into one continuous signal.

2. A signal time compression or expansion system as claimed in claim 1 further comprising means responsive to the respective pulse signals of said ring counter means for producing window-function signals, and a plurality of voltage-controlled amplifiers, each of which is connected between the corresponding one of the shift registers and said mixing means, said voltage-controlled amplifiers responsive to the window-function signals smoothing the rising parts and falling parts of the envelope of the audio signals read out of the shift registers.

3. A signal time compression or expansion system comprising:

means for supplying audio signals reproduced from a recording medium at a speed different from that at which the audio signal have been recorded by a recording and reproducing apparatus, the ratio of the two speeds being P;

means for generating clock pulses having a frequency F;

counter means responsive to the clock pulses for generating a pulse each time it has counted the clock pulses of predetermined number;

ring counter means responsive to the output pulses of said counter means for producing N pulse signals having a pulse width equal to the time interval between adjacent two output pulses of said counter means, phases of the first, second, to the Nth pulse signals being shifted successively by the pulse width, N being a positive integer greater than two;

frequency converting means responsive to the clock pulses for producing (N-1) clock pulses respectively having frequencies $F/p, F_2/p, \ldots F/p^{N-1}$;

N gate circuits, the first gate circuit responsive to the first pulse signal of said ring counter means passing the clock pulses of frequency F during time intervals corresponding to the pulse width of the first pulse signal and interrupting the clock pulses of frequency F during the other time intervals, the $n$th gate circuit, $n$ being an integer between two and N, responsive to the $n$th pulse signal of said ring counter means passing the clock pulses of frequency $F/p^{n-1}$ during time intervals corresponding to the pulse width of the nth pulse signal and interrupting the clock pulses of frequency $F/p^{n-1}$ during the other time intervals;

first gating means responsive to the Nth pulse signal of said ring counter means for interrupting the supplied audio signals furing time intervals corresponding to the pulse width of Nth pulse signal and passing the supplied audio signals during the other time intervals;

a shift register connected to said first gating means to receive the output signal of said first gating means;

OR circuit means having N inputs which respectively receive the output signal of the corresponding one of said N gate circuits for OR-gating the output signals of said N gate circuits to apply the gated clock pulses to said shift register to write and store the output signal of said first gating means in said shift register and read out the stored audio signal from said shift register; and second gating means responsive to the first pulse signal of said ring counter means for interrupting the output signal of said shift register during time intervals corresponding to the pulse width of the first pulse signal and passing the output signal of said shift register during the other time intervals.

4. A signal time compression or expansion system as claimed in claim 3 wherein N is five and P is two, said frequency converting means comprising a four-bit counter responsive to the clock pulses of frequency F for generating four clock pulses respectively having frequencies F/2, F/4, F/8, and F/16.

5. A signal time compression or expansion system comprising:

means for supplying audio signals reproduced from a recording medium at a speed different from that at which the audio signals have been recorded by a recording and reproducing apparatus;

oscillator means for generating first clock pulses in response to a first voltage applied thereto and generating second clock pulses in response to a second voltage applied thereto, the frequency ratio of the first clock pulses to the second clock pulses being equal to the ratio of the speed at which the audio signals are reproduced to the speed at which the audio signals have been recorded;

counter means responsive to the first clock pulses of said oscillator means for producing the second voltage when it has counted M pulses for producing the first voltage when it has counted M pulses of the second clock pulses;

low-pass filter means responsive to the supplied audio signals for passing frequency components including frequencies which are multiplied frequencies of first and second formants by the ratio of the speed at which the audio signals are reproduced to the speed at which the audio signals have been recorded;

high-pass filter means responsive to the supplied audio signals for passing frequency components other than the frequency components passing through said low-pass filter means;

first gating means responsive to the first voltage for passing the output signal of said low-pass filter means and responsive to the second voltage for interrupting the output signal of said low-pass filter means;

a shift register having a capacity of M for writing and storing the output signal of said first gating means in response to the first clock pulses and reading out the stored signal in response to the second clock pulses;

second gating means for interrupting the read-out signal from said shift register in response to the first voltage and passing the read-out signal from said shift register in response to the second voltage;

delay means responsive to the output signal of said high-pass filter means; and mixer means for mixing the output signal of said second gating means with the output signal of said delay means.

* * * * *